United States Patent Office 3,405,167
Patented Oct. 8, 1968

3,405,167
FLUOROESTERS
Robert A. Braun, Newark, Del., assignor to E. I. du Pont de Nemours and Company, Wilmington, Del., a corporation of Delaware
No Drawing. Filed Oct. 5, 1965, Ser. No. 493,244
9 Claims. (Cl. 260—476)

ABSTRACT OF THE DISCLOSURE

Fluoroesters of the formula

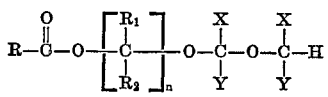

where R can be phenyl, substituted phenyl, or alkyl, $R_1$ and $R_2$ are hydrogen or alkyl and X and Y are perfluoroalkyl, useful as plasticizers in acrylic coatings.

---

This invention relates to novel fluoro esters. It is more particularly directed to compounds represented by the structure:

(1) 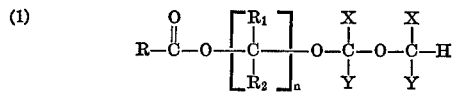

where:

R can be phenyl, phenyl substituted with alkoxy of 1 through 5 carbon atoms, alkyl of 1 through 5 carbon atoms, chlorine, fluorine, or cyano, alkyl of 1 through 5 carbon atoms, or

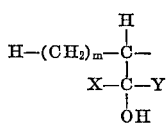

where $m$ is a number 0 through 4;
$R_1$ and $R_2$ can be hydrogen or alkyl of 1 through 5 carbon atoms,
X and Y can be perfluoroalkyl of 1 through 5 carbon atoms; and
$n$ is a number 2 through 4.

Illustrative of the perfluoroalkyl radicals in the X and Y positions are —$CF_3$, —$C_2F_5$ and —$C_3F_7$.

The compounds of the invention are useful as plasticizers in acrylic coatings. To use the compounds as plasticizers one simply mixes a desired compound with a solution of an acrylic polymer such as polymethyl methacrylate and then casts a film from the mixture. Concentrations of from 10 through 25 percent, by weight of the cast film, give the best plasticizing effect.

Preferred for this use are:

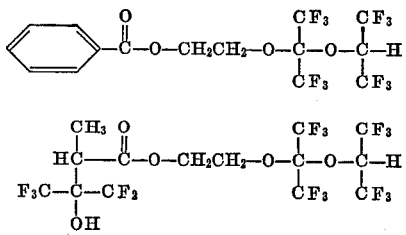

The compounds of the invention can be prepared by reacting a cyclic acetal with a perfluoroketone according to one of the following equations:

(2) 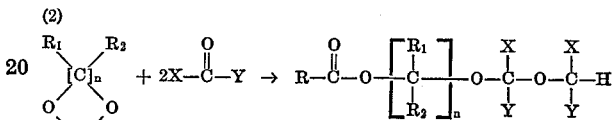

(3) 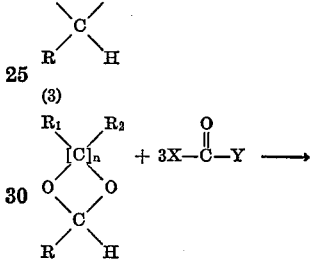

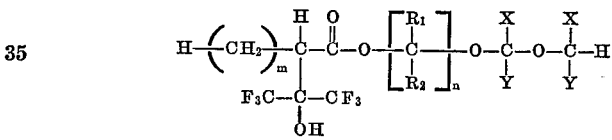

These reactions are shown as giving distinct products. As a matter of fact, however, each reaction produces both products in varying ratios to one another depending upon the proportions of the ketone reactant used. For example, an increase in the molar quantity of the ketone reactant used will give more of the product shown in Equation 3. Use of more than 3 mols of the ketone reactant will give the product of reaction (3) almost exclusively. Both products are liquids having boiling points sufficiently different to permit their easy separation by fractional distillation.

The products are prepared according to these reactions by adding stoichiometric proportions of suitable reactants to a stainless steel bomb, which is then heated at 100–200° C. for from 6 to 8 hours. The bomb is then vented to permit the unreacted reactants to escape and the resulting liquid is fractionally distilled to separate the products.

The cyclic acetal reactants are, generally speaking, commercially available. Those which are not can be prepared by reacting an aldehyde with a glycol in the presence of an acid catalyst according to methods shown in the J. Org. Chem. 29, 286 (1964).

For the most part, the ketone reactants are also commerically available. Those which are not can be prepared according to a method shown in J.A.C.S. 77, 4930 (1955).

The invention will be more easily understood and readily practiced by referring to the following examples. It is to be understood that these examples are representative and illustrative and show only preferred embodiments. Those skilled in the art will doubtless be able to compose many variations on the central theme of this invention, such as the addition of innocuous substituents to those compounds shown. These variations are naturally considered to be part of the inventive concept. In these examples, all parts are by weight unless otherwise indicated.

EXAMPLE 1

A mixture of 2-n-propyl-1,3-dioxolane (23.8 parts, 0.205 mol) and hexafluoroacetone (103.0 parts, 0.62 mol) was heated in a stainless steel bomb at 150° C. for 8 hours. The resulting colorless liquid product (91.8 parts) was fractionated in a spinning band column to give 24.5 parts of—

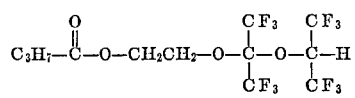

having a boiling point of 90–91° C. at 4.3 mm. of pressure, a refractive index $N_D^{25}$ 1.3415 and an analysis:
Calcd.: C, 32.16; H, 2.70; F, 50.86. Found: C, 42.46; H, 2.59; F, 50.86.

and 44.8 parts of—

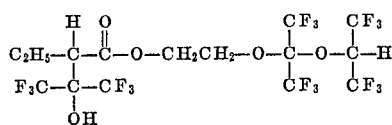

having a boiling point of 110° C. at 1.4 mm. of pressure, a refractive index $N_D^{25}$ 1.3408 and an analysis:
Calcd.: C, 29.33; H, 1.97; F, 55.68. Found: C, 29.65; H, 1.89; F, 55.63.

EXAMPLE 2

Hexafluoroacetone (70 parts, 0.42 mole), 2-phenyl-1,3-dioxolane (30 parts, 0.2 mole) and benzene (50 parts) were mixed and placed in a stainless steel bomb. The bomb was heated for 8 hours at 175° C., then cooled and vented. The solvent was removed at reduced pressure and the liquid residue fractionated on a spinning band column to give 82.0 parts of—

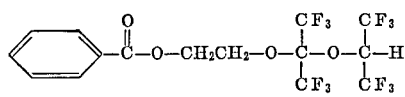

This colorless liquid product had a refractive index $N_D^{25}$ 1.3990 and a boiling point of 69° C. at 0.15 mm. of pressure.
*Analysis.*—Calcd.: C, 37.36; H, 2.09. Found: C, 37.64; H, 1.90.

EXAMPLE 3

Hexafluoroacetone (170 parts, 1.02 mols) and 2-ethyl-1,3-dioxolane (59 parts, 0.5 mol) were placed in a stainless steel bomb and heated for 8 hours at 150° C. The bomb was then cooled, vented, and the resulting liquid fractionated on a spinning band column to give 27.3 parts of—

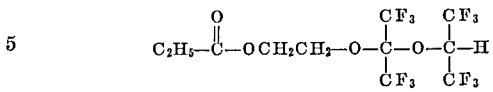

having a boiling point of 77° C. at 14 mm. of pressure, a refractive index $N_D^{25}$ 1.3476 and an analysis:
Calcd: C, 35.83; H, 3.76; F, 42.51. Found: C, 35.65; H, 4.03; F, 42.32.

EXAMPLE 4

Hexafluoroacetone (250 parts, 1.5 mols) and 2-methyl-1,3-dioxolane (44 parts, 0.5 mol) were mixed and placed in a stainless steel bomb. The bomb was heated at 150° C. for 6 hours, cooled and then vented. The resulting liquid was fractionated to give 226.2 parts of—

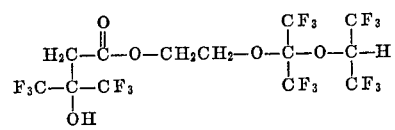

having a boiling point of 103° C. at 1.2 mm. pressure, a a refractive index $N_D^{25}$ 1.3302, and an analysis:
Calcd.: C, 27.39; H, 1.41; F, 59.98. Found: C, 27.10; H, 1.50; F, 59.99.

EXAMPLE 5

Hexafluoroacetone (260 parts, 1.56 mols) and 2-ethyl-1,3-dioxolane (59 parts, 0.58 mol) were mixed and placed in a stainless steel bomb. The bomb was heated at 150° C. for 8 hours. The resulting liquid was fractionated to give 185.0 parts of—

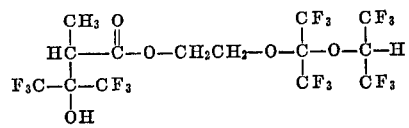

having a boiling point of 110° C. at 2.5 mm. of pressure, a refractive index $N_D^{25}$ 1.3352, and an analysis:
Calcd.: C, 29.02; H, 1.68; F, 56.97. Found: C, 28.36; H, 1.83; F, 56.89.

EXAMPLE 6

Hexafluoroacetone (250 grams, 1.5 mols) and 2-phenyl-1,3-dioxane (110 parts, 0.67 mol) were mixed and placed in a stainless steel bomb. The bomb was heated at 150° C. for 8 hours, then cooled and vented. The resulting liquid was fractionated on a spinning band column to give 83.5 parts of—

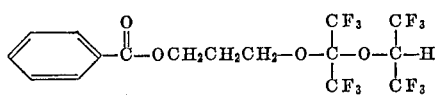

having a boiling point of 120° C. at 3 mm. of pressure, a refractive index $N_D^{25}$ 1.3975, and an analysis:
Calcd.: C, 38.75; H, 2.44; F, 45.94. Found: C, 38.71; H, 2.50; F. 45.57.

The following listed compounds can be prepared in the same manner by substituting the following listed reactants, in the listed proportions, for hexafluoroacetone and 2-phenyl-1,3-dioxane:

| Cyclic Acetal Reactant | Ketone Reactant | Product |
|---|---|---|
| 2-(2-methylphenyl)-1,3-dioxolane (82.0 g.) | $(CF_3)_2C=O$ (166.0 g.) | ![structure with CH3-phenyl-C(=O)-O-CH2-CH2-O-C(CF3)2-O-C(CF3)2-H] |
| 2-(4-cyanophenyl)-1,3-dioxane (94.5 g.) | $(C_2F_5)_2C=O$ (266.0 g.) | NC-phenyl-C(=O)-O-(CH2)3-O-C(C2F5)2-O-C(C2F5)2-H |
| 2-(3-fluorophenyl)-1,3-dioxolane (84.0 g.) | $(CF_3)_2C=O$ (166.0 g.) | F-phenyl-C(=O)-O-CH2-CH2-O-C(CF3)2-O-C(CF3)2-H |
| 2-(4-chlorophenyl)-1,3-dioxolane (92.3 g.) | $(C_5F_{11})_2C=O$ (566.0 g.) | Cl-phenyl-C(=O)-O-CH2-CH2-O-C(C5F11)2-O-C(C5F11)2-H |
| 2-(4-ethoxyphenyl)-1,3-dioxane (104.0 g.) | $(CF_3)_2C=O$ (166.0 g.) | $C_2H_5O$-phenyl-C(=O)-O-(CH2)3-O-C(CF3)2-O-C(CF3)2-H |

EXAMPLE 7

The compound prepared in Example 5 was mixed, at concentrations of 8%, 15%, 20% and 25% by weight, with a 40% solution of polymethylmethacrylate in a 50/50 toluene/acetone mixture. Films were then cast from this solution on steel panels with a doctor blade. The films were air dried and then baked at 50–100° C. for 15–30 minutes.

These films showed superior flexibility and better adhesion to the steel panels than polymethylmethacrylate films containing equivalent proportions of butylbenzyl phthalate as a plasticizer.

Other perfluoroketones such as $(C_2F_5)_2C=O$, $$(C_3H_7)_2C=O, \quad (C_4F_9)_2C=O$$

and $(C_5F_{11})_2C=O$ can be used in place of hexafluoroacetone, in equivalent amounts, to give the corresponding compounds of the invention.

What is claimed is:
1. A compound of the formula:

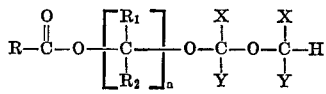

where:
R is phenyl, phenyl substituted with alkoxy of 1 through 5 carbon atoms, alkyl of 1 through 5 carbon atoms, chlorine, fluorine, or cyano, alkyl of 1 through 5 carbon atoms, or

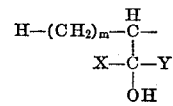

where $m$ is a number 0 through 4;
$R_1$ and $R_2$ are hydrogen or alkyl of 1 through 5 carbon atoms;
X and Y are perfluoroalkyl of 1 through 5 carbon atoms; and
$n$ is a number 0 through 4.

2. A compound of the formula:

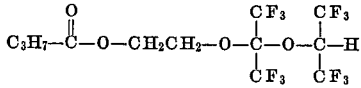

3. A compound of the formula:

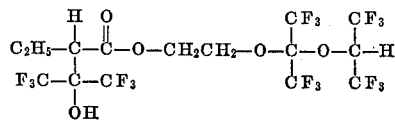

4. A compound of the formula:

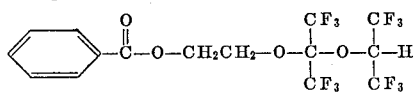

5. A compound of the formula:

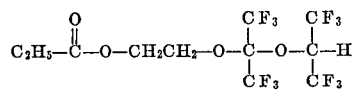

6. A compound of the formula:

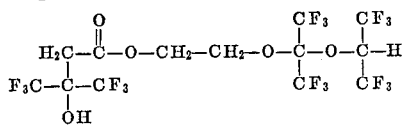

7. A compound of the formula:

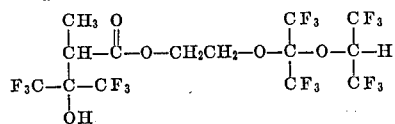

8. A compound of the formula:

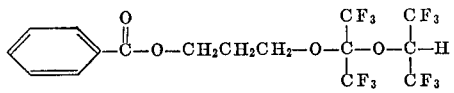

9. A method for preparing the compounds of claim 1, said method comprising reacting a ketone of the formula:

where X and Y are defined as in claim 1, with a cyclic acetal of the formula:

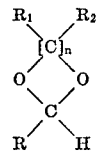

where R, $R_1$, $R_2$ and $n$ are defined as in claim 1, at a temperature of from 100° C. to 200° C., at autogenous pressure, for from 6 to 8 hours, and thereafter recovering the liquid product from the reaction mass.

References Cited

UNITED STATES PATENTS 2,921,957  1/1960  O'Rear et al. _____ 260—485

LORRAINE A. WEINBERGER, *Primary Examiner.*

T. L. GALLOWAY, *Assistant Examiner.*